Figure 1:
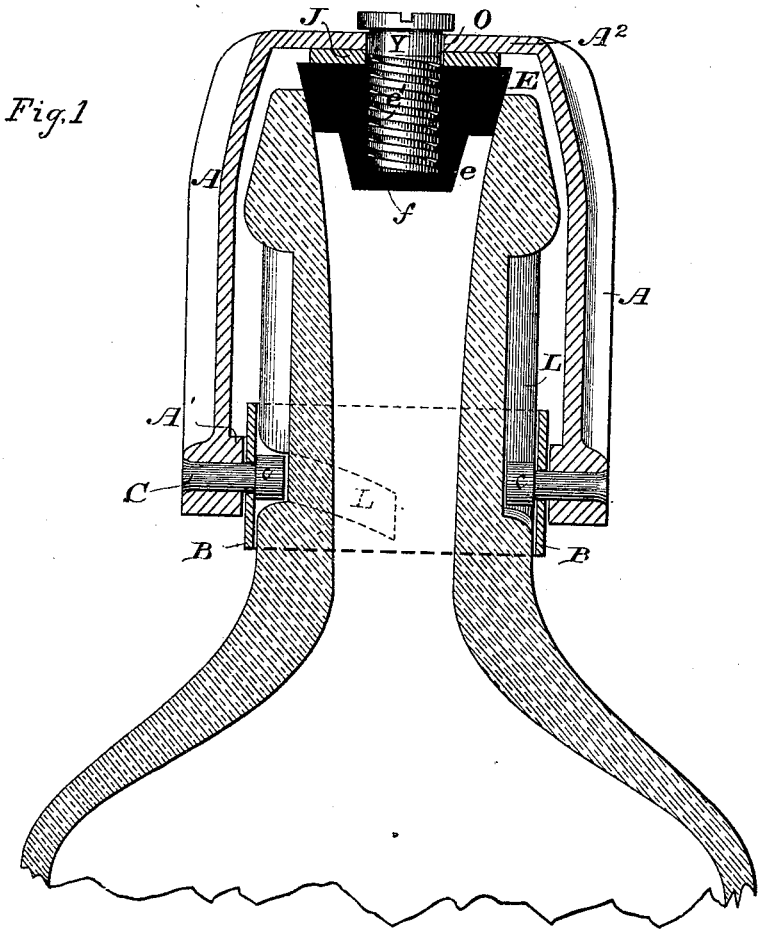

(No Model.)

A. C. SCHULZ.
BOTTLE STOPPER.

No. 266,727. Patented Oct. 31, 1882.

WITNESSES
Wm A. Skinkle
M. Jannus

INVENTOR
Adolph C. Schulz
By his Attorney
C S Whitman

UNITED STATES PATENT OFFICE.

ADOLPH C. SCHULZ, OF LA SALLE, ILLINOIS.

BOTTLE-STOPPER.

SPECIFICATION forming part of Letters Patent No. 266,727, dated October 31, 1882.

Application filed May 6, 1882. (No model.)

*To all whom it may concern:*

Be it known that I, ADOLPH C. SCHULZ, a citizen of the United States, residing at La Salle, in the county of La Salle and State of Illinois, have invented certain new and useful Improvements in Bottle-Stoppers; and I do hereby declare the following to be a full, clear, and exact description of the invention, such as will enable others skilled in the art to which it appertains to make and use the same.

The accompanying drawing is a sectional view of my invention as applied to a bottle.

My invention consists in the improved bottle-stopper and attaching and fastening devices, hereinafter fully described.

In my improvement I attach the bail A to the outside of collar B by rivets or screws C, inserted from the inside of the collar, and riveted or otherwise secured to the bail, the internally-projecting heads $c$ traveling in the slots L in the vessel. At the point where the bail joins the collar it is formed with thickened bearing-surfaces A' on the inside, which thicker portions rest against the collar and afford a more durable hold for the rivets or screws, and render the ends of the bail less liable to be split or spread by the twisting incidental to the fastening and unfastening of the stopper. The bail A extends up the sides of the vessel in the form of an inverted letter U. The top side is made flat, and is nearly as wide as the mouth of the vessel, affording a good equal bearing for the stopper. The said top section is formed with a hole, O, through which the left-hand screw Y or flanged metal cap $h$ passes to secure the stopper to the bail.

The stopper E $e$ is composed of any suitable elastic material, preferably rubber, and is made in the form of a flat thin disk, somewhat larger at its top side than the mouth of the vessel to be closed, and having a smaller disk, $e$, integral therewith, projecting from the center of its lower side. Each of these disks tapers downward and resembles in outline the form of a cone. The stopper is formed with a hole, $e'$, extending centrally from the upper side nearly through the stopper. On the sides of this hole is formed a screw-thread, $f$, corresponding to the screw Y, by means of which the stopper is pivoted to the bail.

The washer J is placed between the top of the bail and the elastic material of the stopper, by the use of which any injury to the stopper by the twisting and turning of the bail while being locked and unlocked is prevented and an entirely vertical movement of the stopper secured.

The band B encircles the neck of a bottle or jar, having vertical and inclined lateral slots L formed therein, and heads of the rivets or screws C traveling therein, imparting a vertical and inclined rotary motion to the band and bail, which presses down and secures the stopper in the vessel.

The friction of the turning bail being received by the washer J, any injury to the most costly part of the stopper—that is, the elastic material—is avoided and great durability secured.

What I claim, and desire to secure by Letters Patent, is—

In a bottle-stopper, the double-cone-shaped elastic plug E $e$, washer J, and screw Y, in combination with the bail A, provided with rivets C C, having heads $c\,c$, the collar B, and vessel formed with vertical and inclined lateral slots L, as shown and described.

In testimony whereof I hereto affix my signature in presence of two witnesses.

ADOLPH C. SCHULZ.

Witnesses:
F. JANNUS.
W. C. DUVALL.